US00RE39940E

(19) United States
(12) Reissued Patent
Frejborg et al.

(10) Patent Number: US RE39,940 E
(45) Date of Reissued Patent: Dec. 18, 2007

(54) SCREEN PLATES AND METHODS OF MANUFACTURE

(75) Inventors: Frey Å. Frejborg, Queensbury, NY (US); Lassi J. Halonen, Queensbury, NY (US)

(73) Assignee: Advanced Fiber Technologies (AFT) Trust, Sherbrooke (Quebec) (CA)

(21) Appl. No.: 10/660,689

(22) Filed: Sep. 12, 2003

Related U.S. Patent Documents

Reissue of:
(64) Patent No.: 5,200,072
Issued: Apr. 6, 1993
Appl. No.: 07/573,839
Filed: Aug. 16, 1990

(51) Int. Cl.
*B01D 29/13* (2006.01)

(52) U.S. Cl. ..... 210/232; 210/489; 210/494.2; 210/497.01; 210/498; 29/447; 29/896.62; 29/897.15

(58) Field of Classification Search ..... 210/232, 210/489, 494.2, 497.01, 498; 29/163.8, 447, 29/896.62, 897.15; 209/168–169; 162/55
See application file for complete search history.

(56) References Cited

U.S. PATENT DOCUMENTS 2,450,838 A * 10/1948 Mathewson ..... 209/270
2,850,165 A 9/1958 Hesse et al.
3,709,186 A * 1/1973 Gotmalm ..... 440/5

(Continued)

FOREIGN PATENT DOCUMENTS

| | | |
|---|---|---|
| DE | 25 33 240 | 2/1976 |
| EP | 0 079 811 | 5/1983 |
| EP | 0 236 843 | 9/1987 |
| EP | 0 299 258 | 1/1989 |
| EP | 0 294 832 | 4/1991 |
| EP | 0 471 195 | 2/1992 |
| IT | 628633 | 11/1961 |
| WO | WO 97/04474 | 7/1987 |
| WO | WO 90/04675 | 5/1990 |

OTHER PUBLICATIONS

Fiedler's Electron–Beam Drilled Baskets [online], [retrieved on Jan. 27, 2003], retrieved from the Internet: <URL:http://www.fiedler–lp.com/electron.htm>.

Fiedler's ML–Screen Basket [online], [retrieved on Jan. 27, 2003], retrieved from the Internet: <URL:http://www.fiedler–lp.com/ml_bask.htm>.

Fiedler Bar–Screen Baskets [online], [retrieved Jan. 27, 2003], retrieved from the Internet:<URL:http://www.fiedler–lp.com/bar_scree.htm>.

*Primary Examiner*—Chester T Barry
(74) *Attorney, Agent, or Firm*—Heslin Rothenberg Farley & Mesiti P.C.; John Pietrangelo

(57) ABSTRACT

The screen cylinder includes a screening plate having contoured grooves along an inflow side and a backing cylinder having a plurality of openings therethrough and disposed on the outflow side of the screening cylinder. The contoured grooves are elongated in the axial direction and are closely circumferentially spaced one from the other about the screen cylinder. In one embodiment, circumferentially extending grooves are formed along the outflow side of the screening cylinder whereby pulp flows through the contoured grooves into the recesses and then through the openings of the backing cylinder. In another embodiment, the recesses are formed on the inflow side of the backing cylinder, the screening cylinder being provided with elongated slots along its outflow side in registry with the contoured slots. In this manner, increased flow capacity is provided. Additionally, the screening cylinder is removable when worn for replacement by a fresh screening cylinder which may then be secured to the backing cylinder.

39 Claims, 4 Drawing Sheets

U.S. PATENT DOCUMENTS 3,768,648 A * 10/1973 Anderson et al. ..... 210/802
3,941,703 A 3/1976 Binard
4,017,387 A * 4/1977 Hatton et al. ..... 209/240
4,019,987 A 4/1977 Krasnow
4,066,555 A 1/1978 Pascale ..... 210/402
4,146,296 A * 3/1979 Mandlak ..... 359/434
4,200,537 A 4/1980 Lamort
4,206,574 A * 6/1980 Dotsko ..... 451/495
4,257,419 A * 3/1981 Goltner et al. ..... 606/140
4,259,136 A 3/1981 Spiewok
4,264,438 A 4/1981 Frejborg
4,276,265 A * 6/1981 Gillespie ..... 422/311
4,358,370 A 11/1982 Jameson et al.
4,529,520 A 7/1985 Lampenius
4,676,903 A 6/1987 Lampenius et al.
4,776,957 A 10/1988 Lampenius et al.
4,818,403 A 4/1989 Nagaoka
4,832,834 A * 5/1989 Baird, Jr. ..... 209/397
4,836,915 A 6/1989 Frejborg
4,880,540 A 11/1989 Frejborg
4,918,807 A 4/1990 Frejborg
4,950,402 A 8/1990 Frejborg
4,958,843 A * 9/1990 Cole ..... 280/30
4,986,900 A * 1/1991 Mason ..... 209/397
5,011,065 A 4/1991 Musselmann
5,064,537 A * 11/1991 Chupka et al. ..... 210/497.01
5,147,543 A 9/1992 Frejborg
5,192,438 A 3/1993 Frejborg
5,200,072 A 4/1993 Frejborg et al.
5,607,589 A 3/1997 Frejborg
5,624,558 A 4/1997 Aaltonen et al.
5,718,826 A 2/1998 Frejborg
6,021,905 A 2/2000 Frejborg

* cited by examiner

FIG. 3
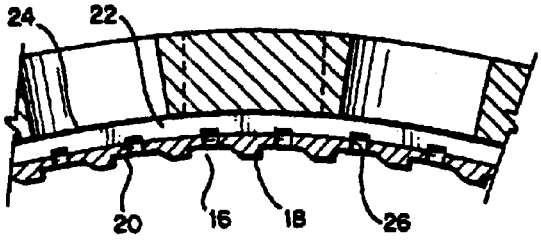
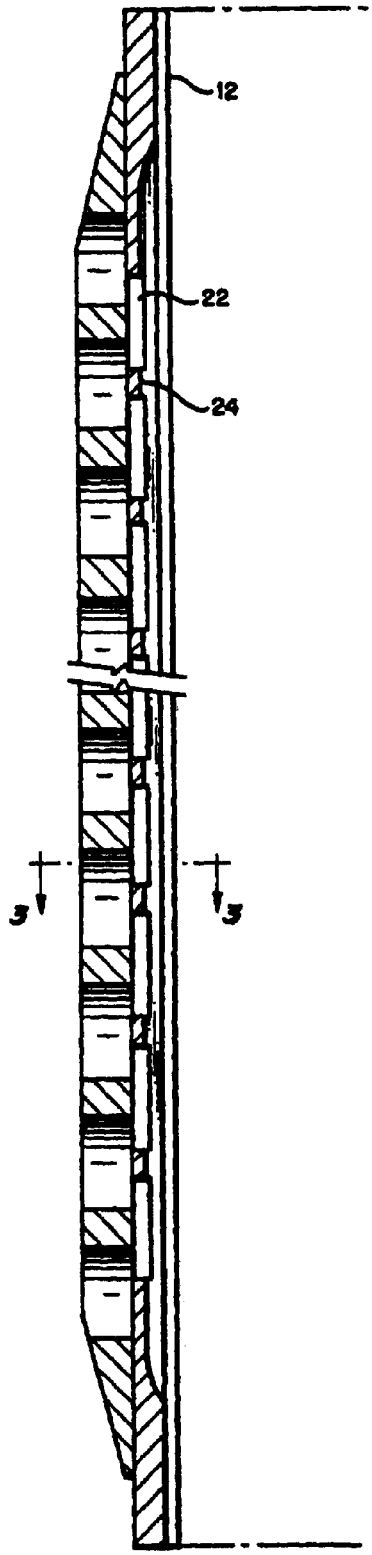
FIG. 4

SCREEN PLATES AND METHODS OF MANUFACTURE

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates to screen plates, e.g., screen cylinders and flat screen plates, for use, for example, in the pulp and paper industry for screening pulps and to methods for their manufacture.

In the formation of paper products from pulp, the pulp is typically screened such that impurities, such as sticks, shives and other undesirable pulp constituents, are removed. This screening process effectively separates the accept and reject portions of the pulp. Screening is generally performed using screen cylinders or flat plates, each of which is provided with openings therethrough for separating the accept and reject portions of the pulp.

In many such screens, whether flat or cylindrical, alternating grooves and ridges are provided in one of the surfaces of the screen. For example, see U.S. Pat. No. 4,529,520. These ridges and grooves are provided for adjusting the flow characteristics of the pulp passing through the screen. While these grooves and ridges have proven to be highly desirable, screens and cylinders with such surface configurations have not heretofore been readily and easily manufactured. For example, such screens are frequently formed by first providing a plurality of openings through a flat metal plate. A plurality of bars are then secured to the inflow side of the plate at longitudinally spaced positions therealong in parallel alignment one with the other to form the ridges and the grooves therebetween. In the case of a screen cylinder the bars are secured in a substantially axial direction. Particularly, the bars are conventionally welded along their opposite sides to the surface of the plate. The fabrication time and, hence, the cost of manufacture of screen plates of this type is quite substantial. Additionally, and importantly, the welds on the opposite sides of the bars occupy substantial space on the surface of the plate. The apertures through the plate are therefore oftentimes blocked by the welds and the number of screen apertures, holes or slots, is accordingly diminished. Welds along the bars also cause stress risers in the screen plate which is subject to heavy vibrations caused by high frequency pulses. Stress cracks and premature failures have frequently been observed in those areas. Additionally, in screen cylinders, rings are frequently secured on the outflow side of the screen cylinder to ensure the stiffness, rigidity and structural strength of the cylinder. Such rings have been secured by welding them circumferentially about the cylinder whereby the welds block a substantial number of screening openings decreasing the effective open area of the screen and consequently the screening throughput.

In conventional screen cylinders, only a limited percentage of the cylinder has screening slots, apertures and the like. This limits the flow through the screen and hence its capacity. It will be appreciated that it is not simply a matter of increasing the number of apertures through the screen plate to compensate for such reduced numbers because predetermined spacings between the apertures, holes or slots must be maintained to avoid the stapling phenomena which clogs the screen plate. Also, structural considerations have often been factors limiting screening capacity. Large bands of metal are often applied about the screen cylinder to provide structural strength and these effectively limit the effective number of openings.

Additionally, screen plates and cylinders used in the pulp and paper industry are subjected to high wear rates, even with hardened surface treatments, and are exposed to corrosive chemicals. In fact, it is not uncommon for plates of this type to completely wear out within weeks of their initial use, necessitating replacement with wholly new plates. These plates and cylinders are quite expensive.

Therefore, in accordance with the present invention, there are provided screen plates for use in the pulp and paper industry having substantially increased efficiency, flow capacity, and strength characteristics, as well as reduced manufacturing costs and fabrication times in comparison with prior methods of forming similar-type plates. Also, the present invention enables substantially reduced replacement costs of the screen plates when worn whereby the end-user does not need to bear the costs of a wholly new screen plate when replacing the worn plate.

Particularly, the present invention provides a screen formed of two separate layers. The first layer comprises a screening plate having narrow slots or small apertures and the second layer comprises a backing plate affording the screening plate the necessary structural strength for pressure screening in the pulp and paper environment.

For purposes of this description, the terms inflow and outflow surfaces designate the sides of the plates through which the flow enters and exits, respectively. The terms inflow and outflow will also refer to other features of the plates hereof, it being understood that the parts so designated lie on the respective entry and exit sides of the plate or elements thereof with reference to the direction of pulp flow. To form the screening plate, in accordance with a first preferred embodiment of the present invention, and preferably for screening low consistency pulps, the outflow face of a plate, for example, a flat plate, is provided with rows of grooves with parallel ridges or bands of material therebetween. The width of the grooves is many times the width of the resulting ridges or bands. Blind grooves are then formed in the opposite inflow face of the plate. These inflow grooves extend in a direction generally normal to the outflow grooves. These blind inflow grooves are preferably contoured and are formed in the plate to a depth such that the contoured grooves do not open through the plate, i.e., do not open through the bottoms of the outflow grooves. Slots are then formed through the bottoms of the contoured grooves and these slots open through the bottoms of the outflow grooves thereby establishing communication between the inflow and outflow sides of the plate. These slots also extend part way through the ridges or bands of material between the outflow grooves. Thus, on one side of the screening plate, for example, the inflow side, there are provided generally parallel extending contoured grooves each preferably having at least one inclined surface and which contoured grooves communicate with slots formed through the bottoms of the contoured grooves opening into the outflow grooves on the opposite side of the plate. The screening plate can be made of metal with the grooves and slots formed by machining, water jets, electric discharge mechanisms or by lasers. Additionally, materials other than metal may be utilized. For example, ceramics may be used because, as will become apparent from the ensuing description, the structural support for the screen plate is provided by a backing plate.

The backing plate in this first preferred embodiment of the present invention comprises a perforated plate having a plurality of relatively large openings in comparison with the slots through the screening plate. The size and number of the openings is, however, consistent with the requirement that the backing plate structurally supports the screening plate.

Where a flat screen plate is desired, the two flat plates are registered one with the other, with the backing plate disposed along the outflow side of the screening plate and secured one to the other, for example, by welding, soldering, riveting or adhesives. The backing plate thus engages the screening plate and forms a structural net-like supporting structure therefor.

To form a screen cylinder, the screening plate is preferably formed initially in a flat configuration as previously described. The plate is then rolled into a cylindrical configuration, the inflow contoured grooves preferably extending substantially parallel to the axis of the cylindrical plate and the outflow grooves extending circumferentially about the cylinder. (Of course, the inflow contoured grooves may extend circumferentially of the cylinder). The edges of the screening plate are then secured, for example, by welding to one another to form the screening plate. Where an outflow screen cylinder is desired, the backing plate is rolled into a cylindrical shape having an inside diameter slightly smaller than the outside diameter of the screening plate. The backing plate is then heated to expand it, thereby enabling the cylindrical screening plate to be received within the backing plate. The backing plate is then heat-shrunk onto the screening plate. The plates are then secured one to the other, e.g., by welding, although shrink-fitting one plate onto the other may be itself sufficient to secure the plates to one another.

With this construction, it will be appreciated that the stiffness, rigidity and structural strength of the backing plate is effectively transmitted to the screening plate. The ridges on the outflow side of the screening plate bear against the inflow surface of the backing plate and afford support in those areas of the screening plate spanning the outflow grooves in the screening plate. Note that this construction also eliminates the capacity reducing support rings previously required in screen cylinders of this type, further enabling an increase in capacity through an increase in the lengths of the slots and contoured grooves to substantially the full axial length of the screen cylinder.

In this preferred form of the invention, it will be appreciated that a substantial increase in capacity or throughput is provided, as well as a capability of replacing the screening plate, once worn, with a wholly new screening plate, without replacing the backing plate. With respect to the increased capacity, it will be appreciated that the contoured grooves in a screen cylinder of this type may extend substantially the full axial length of the cylinder, i.e., terminate just short of the ends of the cylinder. The slots through the base of the contoured grooves, likewise, are substantially coextensive in length with the contoured grooves. The contoured grooves and slots therefore open into the circumferentially extending grooves on the outflow side of the screening plate, i.e., into the annular recesses between the circumferentially grooved outflow surface of the screening plate and the inner inflow surface of the backing plate. Those grooves also open into the apertures formed in the backing plate. It will be appreciated that the flow capacity of the outflow grooves of the screening plate and the apertures in the backing plate are substantially greater than the flow capacity through the contoured grooves and slots of the screening plate. By forming the slots and contoured grooves substantially the length of the cylinder, without interruption, substantially increased throughput is provided in comparison with prior screen cylinders of this type. For example, in screen cylinders previously manufactured, wide bands of metal conventionally extend in circumferential and axial directions for purposes of affording structural support to the cylinder. Such bands substantially diminished the flow through capacity of the screen cylinder. Here, however, the ridges or bands of material between the grooves on the outflow side of the screening plate are relatively small inasmuch as they do not provide substantial structural support to the screening plate. The accepts essentially flow about the bands or ridges and they effectively do not see the bands or ridges. Also, the relatively narrow, circumferential bands are partially recessed in a radial outward direction when the blind slots are cut between the bases of the contoured and outflow grooves, thereby effectively eliminating blockage in those areas of the bands and enabling flow around the bands through the slot portions directly radially in front of the bands.

As noted previously, the screening plate can be replaced when worn by breaking the welds or other securing means between the backing and screening plates. By machining, or chemical treatment if adhesives are used, the worn screening plate may be removed from the backing plate. A new screening plate may then be disposed and secured to the backing plate similarly as previously described. It will be appreciated that the screening plate may be formed of much thinner material then screen plates have previously been formed where structural considerations were necessary. Thus, when the present screening plate has worn to the point where it needs replacement (corresponding to a point where the structural integrity of prior screen plates would be brought into question or when the contoured grooves are no longer effective), the screening plate may be removed from the backing plate and replaced. The cost of this replacement with what is, in effect, a substantially wholly new screen plate, is sharply reduced, e.g., approximately halved, in comparison with the cost of a wholly new screen cylinder. Additional cost savings may be effected by using different materials for the screen plate and backing plate. For example, a lower grade metal may be used for the structural backing plate than for the screening plate.

It will also be appreciated that the arrangement of cylindrical screening and backing plates may be reversed where an inflow configuration is desired. That is, the screening plate may lie radially outwardly of the backing plate with the contoured grooves on the radially outermost inflow surface of the screening plate. Furthermore, costs savings are achieved where special treatments to the screening plates are used and which are not required for use on the backing plate. Additionally, the backing plate may be fabricated inexpensively and placed in inventory, while awaiting orders from customers for particular screen cylinders having particular sized contoured grooves. Thus, upon a customer order, the screening plate may be fabricated and fit to the inventoried backing plate. Also, increased longevity is accomplished in the present invention by minimizing the fatigue factor in the screening plate. Thus, while the screening plate is subjected to compressive forces during use, its fatigue factor in the screening plate. Thus, while the screening plate is subjected to compressive forces during use, its fatigue factor is greatly reduced because it relies solely on the backing plate for structural support.

In another embodiment of the present invention, preferably for screening high consistency pulp and where an even stronger screening plate is desired, the outflow grooves of the screening plate may be formed as inflow grooves in the backing plate. In this embodiment, the backing plate may have a plurality of inflow grooves formed along its inflow surface. Blind apertures may be formed into its opposite surface and which open into the inflow grooves. The screening plate, in this latter embodiment, has a series of contoured grooves formed along its inflow surface. Along its opposite outflow surface, there is provided a plurality of blind slots in registry with the contoured grooves. Slots of reduced width are provided opening the bottom of the inflow contoured grooves into the outflow grooves and hence through the outflow surface of the screening plate. The screening plate and backing plate are then joined similarly as described above, in either flat or cylindrical configurations to form the desired flat or cylindrical screen plates. Thus, where a screen cylinder is being formed, it will be appreciated that the flow through the axially extending contoured grooves and slots enters the circumferentially extending grooves of the cylindrical backing plate and passes through its apertures.

In certain applications it is advantageous to angle one or both of the side faces of the contoured grooves of the screening plate and this can be accomplished simply by machining the side faces of the grooves to the appropriate angles. In this manner, one side of the contoured groove may, for instance, be formed perpendicularly to its base, while its opposite side is angled away from the base of the groove.

It will be also appreciated that the aggregate area of the openings through the screening plate is substantially increased in comparison with the aggregate area of the openings at like spacing provided through similar plates of the previously described prior art constructions. Thus, the present invention provides an increase in effective screen area of approximately 20 to 80% with respect to prior, similarly sized, plates. Further, the screen plates of the present invention may be manufactured at substantially reduced costs and fabrication times.

In the description of the invention in the specification and claims, the term "openings" will be used throughout. This term is used for convenience only, and is intended to encompass apertures of all shapes and sizes, including holes, slots, orifices and passageways.

In a preferred embodiment according to the present invention, there is provided a screen cylinder comprising a generally cylindrical screening medium having a plurality of openings therethrough, a generally cylindrical structural backing plate having a plurality of openings therethrough, with the screening medium and the structural backing plate lying concentrically one within the other and having respective opposed surfaces in engagement with one another at an interface therebetween whereby the backing plate structurally supports the screening medium. One of the screening medium and the backing plate has a plurality of circumferentially extending recesses formed in its opposing surface and which pen at the opposing surface of the other of the screening medium and the backing plate at the interface thereof establishing communicates between the respective openings of the screening medium and the backing plate.

In a further preferred embodiment according to the present invention, there is provided a screen plate for screening pulp flowing therethrough comprising a contoured screening medium having a plurality of elongated slots therethrough and extending generally parallel to one another, a structural backing plate having a plurality of openings therethrough, with the screening medium and the structural backing plate lying in registration one with the other and having respective opposed surfaces in engagement with one another at an interface therebetween whereby the backing plate structurally supports the screening medium. One of the screening medium and the backing plate has a plurality of recesses formed in its opposing surface which open at the opposing surface of the other of the screening medium and the backing plate at the interface thereof establishing communication between the respective openings of the screening medium and the backing plate, whereby pulp may flow sequentially through the contoured slots, the recesses and the openings in the backing plate.

In a further preferred embodiment according to the present invention, there is provided a method of manufacturing a screening plate for use in a screen plate for pulp, the screen plate being formed of a screening plate and a backing plate, the screening plate having first and second opposite faces, comprising the steps of (a) forming openings through the first face and into the body of the screening plate to terminate within the screening plate body and (b) forming grooves in the second face arranged to expose the openings formed in step (a) so that the openings extend entirely through the plate, and leave a plurality of ridges in the second face spaced one from the other therealong.

In a further preferred embodiment according to the present invention, there is provided a method of manufacturing a screening plate for use in a screen plate for pulp, the screen plate being formed of a screening plate and a backing plate, the screening plate having first and second opposite faces, comprising the steps of (a) forming elongated, substantially parallel, grooves in the first face, each groove being contoured and having at least two side faces and a bottom, (b) forming openings through the bottom of the grooves in the first face and into the screening plate to terminate within the screening plate short of the second face thereof (c) forming elongated grooves in the second face of the screening plate inclined relative to the longitudinal extent of the grooves formed in step (a) and to a depth to expose the openings formed in step (b) so that the openings extend entirely through the screening plate, and leave a plurality of ridges in the second face spaced one from the other therealong and extending in a direction inclined relative to the longitudinal extent of said contoured grooves.

In a further preferred embodiment according to the present invention, there is provided a method of manufacturing a screen cylinder including a discrete screening plate and a discrete backing plate comprising the steps of (a) rolling a backing plate to form a backing cylinder, (b) attaching the edges of the backing plate together to form a round cylinder, (c) r lling a screening plate to form a screening cylinder, (d) attaching the edges of the screening plate together to form a round cylinder, (e) inserting one of the screening cylinder and the backing cylinder inside the other of the cylinders and (f) shrink-fitting the cylinders into engagement one with the other.

In a further preferred embodiment according to the present invention, there is provided a method of fabricating screen cylinders for use in screening pulp and repairing a worn screen cylinder, comprising the steps of forming a screening cylinder having elongated contoured grooves along an inflow side thereof and slots through the screening cylinder for communicating pulp between inflow and outflow sides of the screening cylinder, forming a backing cylinder having a plurality of openings therethrough between inflow and outflow sides thereof, inserting one cylinder within the other cylinder, shrink-fitting the cylinders into engagement one with the other whereby the backing cylinder structurally supports the screening cylinder and enable flow of pulp through the contoured grooves and slots of the screening cylinder and the openings of the backing cylinder, subsequent to use and when worn, removing the screening cylinder from the backing cylinder, forming a second screening cylinder having elongated contoured grooves along an inflow side thereof and slots through the second screening cylinder for communicating pulp between inflow and outflow sides thereof, engaging the second screening cylinder and the backing cylinder one to the other whereby the backing cylinder structurally supports the second screening cylinder and enables flow of pulp through the contoured grooves and slots of the second screening cylinder and the openings of the backing cylinder.

Accordingly, it is a primary object of the present invention to provide novel and improved screen plates for use in the pulp and paper industry having increased efficiency and capacity for screening pulp with substantial reductions in cost and manufacturing time, as well as screen plates which can be replaced when worn at substantially reduced costs in comparison with providing a wholly new screen plate.

These and further objects and advantages of the present invention will become more apparent upon reference to the following specification, appended claims and drawings.

BRIEF DESCRIPTION OF THE DRAWING FIGURES

FIG. 3 is an enlarged cross-sectional view taken generally about on line 3—3 in FIG. 4;

FIG. 4 is a longitudinal cross-sectional view through the surface of the screen cylinder with parts broken out for ease of illustration;

DETAILED DESCRIPTION OF THE DRAWING FIGURES

Reference will now be made in detail to the present preferred embodiment of the invention, an example of which is illustrated in the accompanying drawings.

Figure 1:
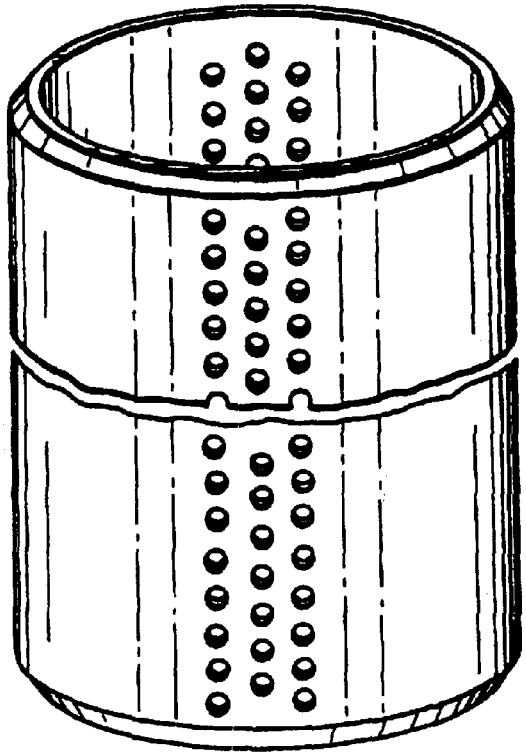
FIG. 1 is a perspective view with parts broken out illustrating a backing plate forming part of a screen cylinder constructed in accordance with the present invention.
Figure 2:
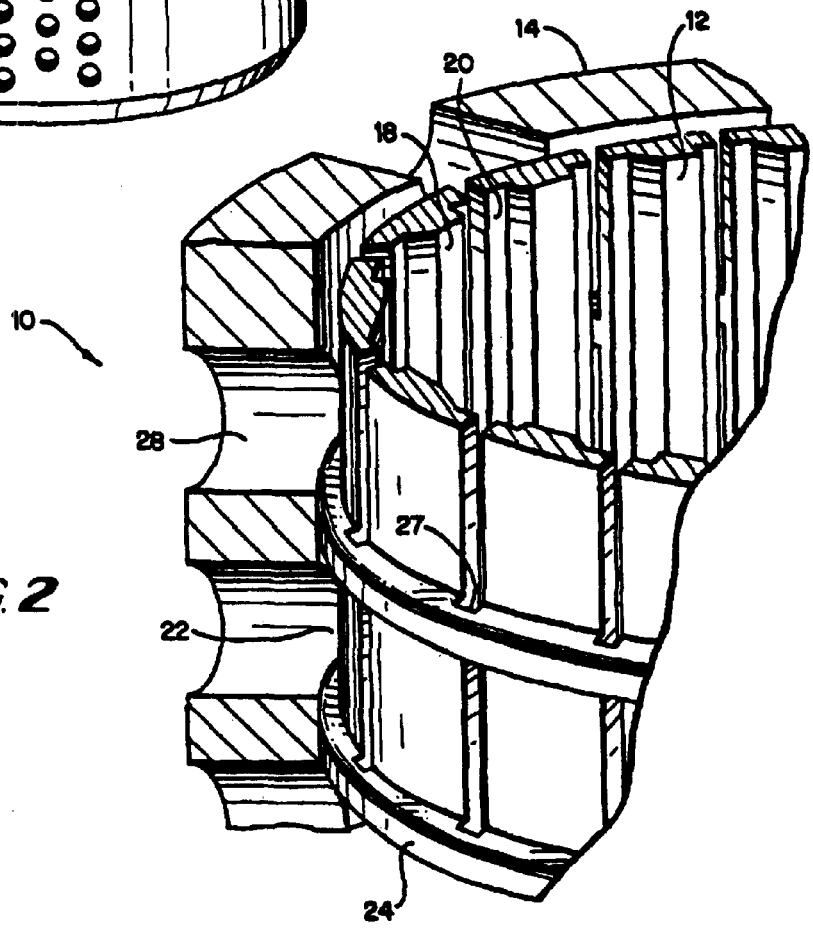
FIG. 2 is an enlarged, highly exaggerated, fragmentary cross-sectional view of a screen cylinder according to the present invention illustrating the juxtaposition of the screening plate and backing plate.
Figure 5:
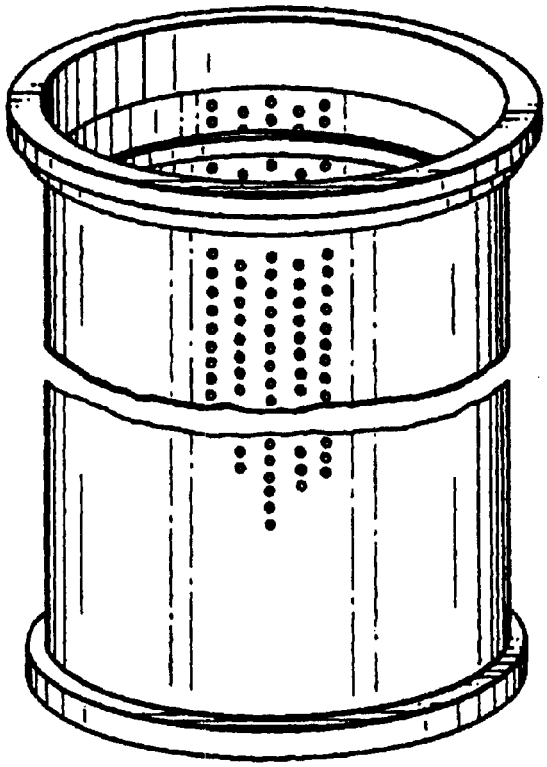
FIG. 5 is a perspective view similar to FIG. 1 illustrating a second embodiment of a backing plate for use in a screen cylinder according to the present invention.
Figure 6:
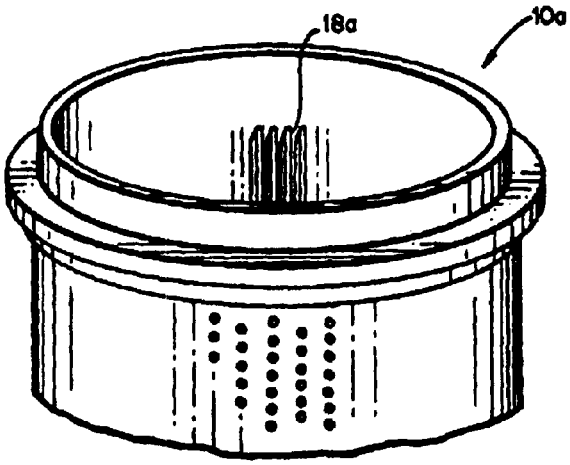
FIG. 6 is a fragmentary perspective view illustrating a screen cylinder, including a screening plate and backing plate therefor, according to a second embodiment of the present invention.

Referring now to FIGS. 2, 3 and 4, there is illustrated a screen plate product, generally designated 10, formed in accordance with the present invention and preferably useful for screening generally low consistency pulp at maximum hydraulic capacity. Screen plate 10 may be formed as a flat screen plate or a screen cylinder as illustrated and is comprised of two different layers, namely, a screening layer/plate 12 and a backing layer/plate 14. In the illustrated form, the screen cylinder is of the outflow type wherein, during screening operations, pulp is introduced into the interior of the cylinder and, accepts flow through the openings in the screening plate and backing plate toward the accepts space outside the cylinder, as will be described. An inflow screen cylinder is within the scope of the present invention as well, wherein the screening plate lies radially outwardly of its backing plate with the flow being radially inwardly.

Referring to FIGS. 2 and 3, screening plate 12 includes an inlet or outlet surface having a plurality of generally axially extending, circumferentially spaced, preferably contoured grooves 16, defining axially extending ridges 18 therebetween. These contoured grooves 16 are formed to a predetermined depth defined by the bases 20 of grooves 16. On the opposite surface or outflow surface of screening plate 12, there is provided a plurality of grooves or recesses 22 which extend perpendicular to contoured grooves 16, i.e., circumferentially about the outflow surface of screen plate 12. Grooves 22 are blind grooves formed to a predetermined depth short of the bases 20 of contoured grooves 16 and are separated in the axial direction one from the other by ridges or bands of screening plate material 24. As illustrated, grooves 22 extend axially many times the axial extent or width of the bands 24. Screen openings 26 are formed in the bottoms of contoured grooves 16 and open through the screening plate into the recesses or grooves 22. Preferably, openings 26 are in the form of narrow slots substantially coextensive in length with contoured grooves 16. Thus, contoured grooves 16 and slots 26 lie at circumferentially spaced locations about screen cylinder 10 and extend substantially the full length of the screen cylinder in the axial direction. Ridges 24 define recesses 22 and are spaced one from the other in an axial direction and extend circumferentially about the cylinder. For purposes of improving flow efficiency and capacity, slots 26 are formed partly into the registering bands 24, as illustrated at 27 in FIG. 2, whereby the base of each slot 26 in band 24 lies radially outwardly of the base of grooves 22.

In accordance with a preferred method of manufacture, the screening plate is initially in the form of a flat plate. Contoured grooves 16 are formed along the inflow surface of the flat screening plate 12 and blind slots 26 are then formed through the bases 20 of the contoured grooves. The opposite or outflow surface of the flat plate is then grooved in a direction perpendicular to the direction of the contoured grooves 16 and slots 26, the grooves 22 opening into the slots 26. Thereafter, the flat plate is rolled into cylinder form and welded along a vertical seam. The sequence f forming the groove and slot formations may be reversed.

Backing plate 14 structurally supports screen plate 12. Backing plate 14 is therefore constructed of a relatively thick metal plate provided with openings or apertures 28. The openings may be cylindrical or other shapes as desired and may be punched or drilled through the material.

Additionally, the arrangement of the openings in the backing plate may comprise any number of different arrangements. Preferably, however, the openings are formed so that their centers locate on the apices of equilateral triangles whereby the structural strength properties of the backing plate are optimized. With that arrangement of openings 28, a substantially net-like supporting structure is formed. It will be appreciated that the inside diameter of backing plate 14 is formed slightly smaller than the outside diameter of screening plate 12.

To interfit the screening and backing plates one with the other, the grooves, slots and openings in the screening and backing plates are formed while the plates lie in a flat configuration. Thereafter, the plates are rolled into cylindrical form and secured, for example, by welding, along their adjoining edges. The backing plate is then heated to expand it. When expanded, the screening plate is inserted within the expanded backing plate. The backing plate is then cooled to heat-shrink it onto the outer surface of the screening plate. Additionally, or in the alternative, the screening plate may be cooled and then inserted into the backing plate. In either event, when the plates reach room temperature, it will be appreciated that because the outside diameter of the screening plate is slightly larger than the inside diameter of the backing plate, the plates are rigidly secured one to the other. The plates may then be finally secured to one another, e.g., by welding, although rivets, screws, adhesives, solders or the like may be used.

Where an inflow cylinder is required, i.e., the screening plate lies on the outside of the backing plate, the inner diameter of the screening plate will be formed slightly smaller than the outer diameter of the interior backing plate. Thus, after rolling and securing the plates into their cylindrical form, the screening cylinder may be heated and the backing cylinder cooled. Once temperature-treated, the backing cylinder may be inserted within the screening cylinder and the plates brought to room temperature, whereby the plates are heat-shrunk one onto the other.

It will be appreciated that with reference to the outflow screen cylinder illustrated in FIG. 2, the accepts portion of the pulp flows radially outwardly through the screen openings in screening plate 12 and the openings in the backing plate to an accepts region outside the cylinder. The rejects are maintained within the screen cylinder for flow axially outwardly through a cylinder end. More particularly, in the illustrated arrangement, it will be appreciated that the accepts portion of the pulp flows through contoured grooves 16, through slots 26, into the grooves or recesses 22 along the outflow side of the screening plate 12 and then through the openings 28 of backing plate 14.

In operation the screen plate in accordance with the present invention demonstrates its superior performance when compared to the screen plates of the prior art. The most critical measure of the capacity or performance of a screen plate is its open area, i.e. the percentage of openings with respect to the entire plate area. The foregoing described structure is an optimal structure with regard to both open area and strength. While the open area of the substantially thin screening plate is very large when compared to conventional screen plates of this type, for instance the screen plates disclosed in U.S. Pat. No. 4,529,520, the strength of the screening plate is ensured by engaging the backing plate on the outflow side of the screening plate. The screening plate also has substantially wide and deep grooves 22 along its outflow surface for receiving the pulp flowing through the slots 20.

As discussed previously, conventional screen plates and cylinders employ structural backing ridges/rings arranged on the back side of a screen. These backing rings occupy a substantial area of the screen plate. Because openings cannot lie in those areas, substantially diminished flow capacity occurs. A typical value for the length of the slotted portion of an ordinary screen cylinder is about 50 to 70% of the entire length of the screen cylinder. The backing rings and end rings attached to both ends of the cylinder take the rest, 50 to 30%, of the length of the cylinder. The screen cylinder of this embodiment of the present invention is able to utilize typically 85 to 95% of the entire length of a screen cylinder due to the formation of continuous slots on the inflow side of the screening plate substantially corresponding in length to the axial extent of the cylinder. Additionally, increased flow capacity is provided because ridges 24 on the outflow side of the screening plate, corresponding to the backing rings of an ordinary screen plate/cylinder structure, are so narrow and are recessed back at 27 from the bases of grooves 22 that pulp fibers are able to pass ridges 24 without any substantial "throttling" in the flow velocity. The fibers essentially do not see the ridges 24 because of their narrow width and because the slot depth at 27 permits fibers in the slots 27 in registry with slots 26 to easily divert the fibers for passage around the remaining portions of the ridges 24.

After the screen cylinder, that is, the screening plate portion thereof, is worn to such an extent that it cannot be used efficiently any more, the screening cylinder may be removed from use and reworked for further use essentially as a wholly new screen cylinder. To accomplish this, the screening plate may be removed, e.g., cut along the welds between it and the backing cylinder, and removed from the latter. The backing cylinder may be checked for any necessary modifications or repair. A new screening plate is then formed and installed within the previously used backing plate (in the case of an outflow screen cylinder) or externally about the previously used backing plate (in the case of an inflow screen cylinder). Thus, the wholly new screening plate and the previously used backing plate are heat-shrunk onto one another and finally secured, for example, by welding, riveting, soldering or gluing, as previously described.

From the above, it will be appreciated that the backing plate may be reused many times with wholly new screening plates as each screen cylinder becomes worn and inefficient. Replacement of the screening cylinder therefore wastes a minimum of material inasmuch as the thicker and heavier backing plate is reused as the structural support for the wholly new screening cylinder and the screening plate may be formed of substantially reduced thickness.

Referring now to the second embodiment of a screen cylinder constructed in accordance with the present invention, there is illustrated in FIGS. 5–8, a screen cylinder, generally designated 10a, preferably useful for screening high consistency pulps where the cylinder is subjected to highly abrasive conditions. Screen cylinder 10a comprises a screening plate 12a and a backing plate 14a. It will be appreciated that, in this embodiment, like reference numerals are applied to like parts as in the prior embodiment, followed by the letter reference "a". In this embodiment, the screening plate 12a includes an inlet or inflow surface having a plurality of generally axially extending, circumferentially spaced, preferably contoured grooves 16a. Grooves 16a, as in the previous embodiment, define ridges 18a therebetween. As in the prior embodiment, each contoured groove 16a is formed to a predetermined depth defined by the base 20a of groove 16a. On the opposite or outflow side of screening plate 12a, there is provided a plurality of slots 30 which are substantially coextensive in length with the contoured grooves 16a, lie in registration with the contoured grooves 16a and are formed to a depth short of the bases 20a of contoured grooves 16a. Slots 30 are thus formed as blind slots to a predetermined depth short of the bases 20a of the contoured grooves 16a. Screen openings 26a are formed in the bottoms 20a of contoured grooves 16a and open grooves 16a into the slots 30. Preferably, the slots 26a are substantially coextensive in length with the contoured grooves 16a and slots 30. Thus, contoured grooves 16a, slots 26a and slots 30 lie in radial registration each with the other, are circumferentially spaced one from the other about screen cylinder 10a and lie in circumferentially spaced axially extending arrays or sets thereof spaced axially one from the other by an intervening circumferentially extending band 32. As in the previous embodiment, the preferred method of manufacture of screening plate 12a is to initially provide a flat plate, thereafter form the contoured grooves 16a, slots 30 and 26a, and roll the grooved and slotted flat plates into cylindrical form, welding the edges one to the other.

Backing plate 14a, similarly as in the previous embodiment, is formed of a structural material. When the backing plate is in a flat form, grooves 40 are formed along one face, i.e., the inflow surface thereof, and in a direction such that, when the backing plate and screening plate form a screen cylinder, the grooves 40 will extend about the backing plate in a circumferential direction and lie axially spaced one from the other. Blind holes 28a are then formed through the flat backing plate from the opposite or outflow side thereof to open into the grooves 40. As in the prior embodiment, the openings may be cylindrical or other shapes, as desired, and may be punched or drilled through the material. Blind holes are used so that the material of the backing plate in the area of the ridges 42 formed between the grooves 40 is not removed. Preferably, the openings are formed so that their centers locate in the apices of equilateral triangles whereby the structural strength properties of the backing plate are optimized. Thus, a substantially structural net-like structure is formed. The flat backing plate may then be rolled into cylindrical form. For outflow screen cylinders as illustrated, the outer diameter of the screening cylinder is slightly larger than the inner diameter of the backing plate. In this manner, once the screening plate and backing plate are rolled into cylinders, the cylinders may be heat-shrunk one onto the other, as previously described. Additional welds or other securing means, such as solder, rivets or glue, may be provided to secure the screening cylinder and backing cylinder one to the other.

Figure 7:
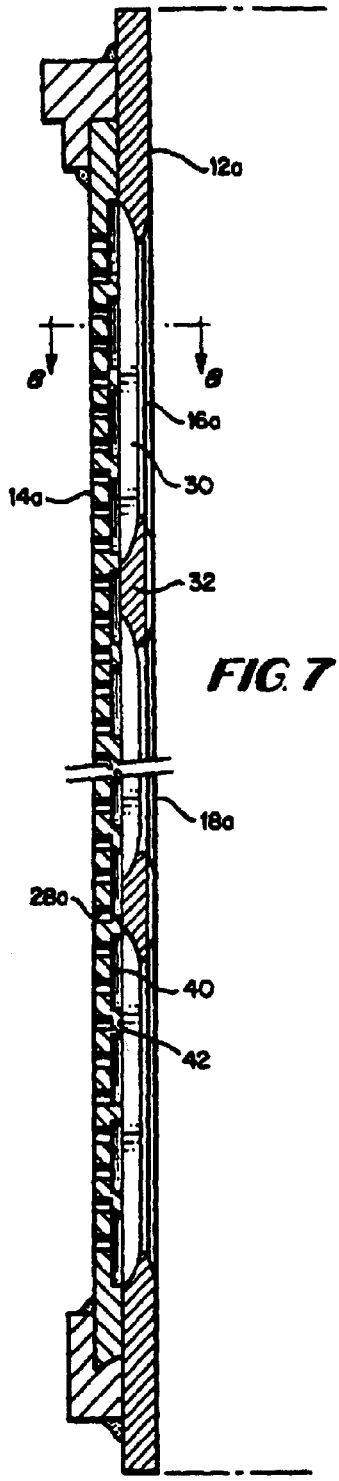
FIG. 7 is a longitudinal cross-sectional view thereof, with parts broken out for ease of illustration.
Figure 8:
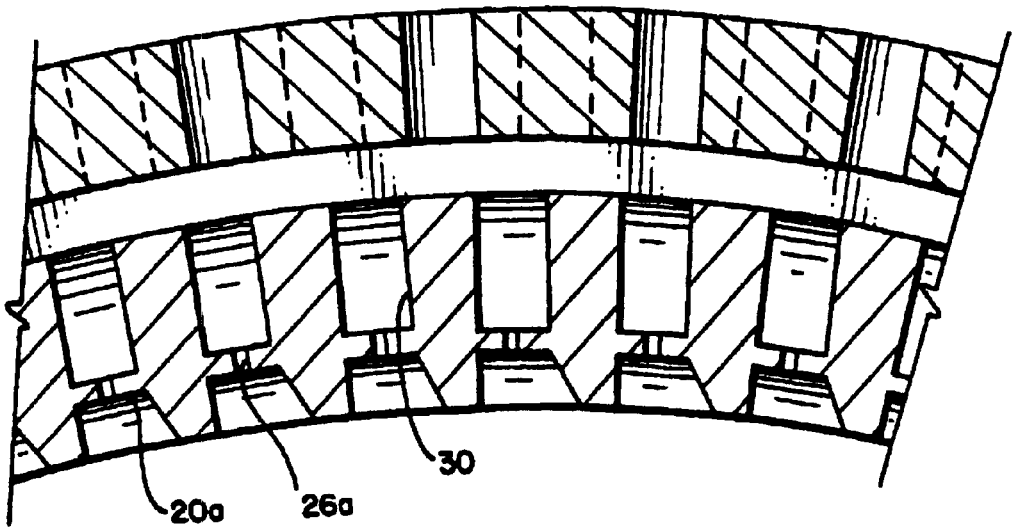
FIG. 8 is an enlarged cross-sectional view thereof taken generally about on line 8—8 in FIG. 7.

From a review of FIG. 7, it will be appreciated that, in operation, the accepts portion of the pulp will flow through the contoured grooves 16a, the slots 26a, slots 30 and into the grooves 40 of the backing plate 14a. The accepts portion continues its passage through the backing plate via openings 28a to the accepts region on the external side of the screening cylinder. It will be appreciated that in this form of the screen cylinder, the grooves 40 and openings 28a of the backing plate are very similar in function to the grooves 22 of the screening plate and the openings 28 of the backing plate in the previous embodiment. That is, the areas of the grooves 40 and apertures 28a are larger than the aggregate area of the slots 26a and are thus able to efficiently receive all of the accepts portion of the flow from the slots 26a.

Similarly as in the previous embodiment, improved capacity for flow through the plate is provided. Additionally, the screen plate 12a may be removed, when worn, from the backing plate 14a by breaking the welds or other securing means between the screening and backing cylinders and removing the screening plate from the backing plate. A wholly new screening plate may then be secured to the backing plate in the manner previously described.

It will be appreciated that in both embodiments of the present invention the screening plate may be heat-treated in a conventional manner to harden the metal. Also, the screening plate may be provided with a coating layer on its screening side, for example, by treating the surface by a laser or plating the surface with chromium, nickel and the like. While the screening plate is preferably formed of steel, other materials may be used, such as a ceramic. Also, a wedgewire screening plate may be used.

A comparison of the performance characteristics of a conventional screen cylinder is made below with respect to low and high consistency screen cylinders of the embodiments illustrated in FIGS. 1–4 and 5–8, respectively, in each of two different cylinder configurations. In the first Table A1, each cylinder has a height and diameter of 1042.8 mm and 1066.88 mm, respectively, a slot width of 0.5 mm and a slot pitch of 3.2 mm (i.e., a centerline-to-centerline distance of 3.2 mm).

TABLE A1

| | Conv. | FIGS. 1-4 | FIGS. 5-8 |
|---|---|---|---|
| Slot Length | 42 | 20 (18) | 52 |
| No. of Slot Rows | 12 | 47 | 13 |
| No. of Slots per Row | 1040 | 1040 | 1040 |
| Axial Slot Length [mm] | 504 | 940 | 676 |
| Total No. of Slots | 12480 | 48880 | 13520 |
| Effective Open Area [$m^2$] | 0.268 | 0.489 | 0.352 |
| Effective Open Area [%] | 8.07% | 14.8% | 10.6% |
| Improvement over Conventional [%] | — | 82% | 31% |

In Table A2 below, each cylinder has a diameter and a height of 508 mm and 546 mm, respectively, a slot width of 0.2 mm and a slot pitch of 3.6 mm.

TABLE A2

| | Conv. | FIGS. 1-4 | FIGS. 5-8 |
|---|---|---|---|
| Slot Length | 49 | 20 (18) | 50 |
| No. of Slot Rows | 6 | 23 | 7 |
| No. of Slots per Row | 437 | 437 | 437 |
| Axial Slot Length [mm] | 294 | 460 | 350 |
| Total No. of Slots | 2622 | 10051 | 3059 |
| Effective Open Area [$m^2$] | 0.0257 | 0.0402 | 0.0306 |
| Effective Open Area [%] | 3.18% | 4.98% | 3.79% |
| Improvement over Conventional [%] | — | 56% | 19% |

From these tables, it will be appreciated that the effective open area of both screen cylinders of the embodiments hereof illustrated in FIGS. 1–4 and 5–8, respectively, have substantially increased hydraulic capacity in comparison with a correspondingly sized conventional cylinder with identically contoured slots. This is evident, for example, from the increase in effective open area of the slots of the screen cylinders hereof and particularly the substantial increase in open area of the cylinder of FIGS. 1–4 preferably used for low consistency pulps.

The following Table B represents a comparison of the strength of the cylinders hereof and a conventional cylinder of the same dimensions, slot width and pitch. Particularly the strength is given in terms of the deformation of a ridge between the slots in directions radially outwardly or inwardly and tangential of the screen cylinder, respectively, in response to a force applied radially from within or from outside the cylinder. In this example, the force applied is 100 kPa and 100% perfect contact between the inner and outer screen members is assumed.

TABLE B

| Deformation (mm) | Conventional | FIGS. 1-4 | FIGS. 4-8 |
|---|---|---|---|
| Radial | 0.340 | 0.200 (59%) | 0.006 (2%) |
| Tangential | 3.23 | 0.10 (3%) | 0.06 (2%) |

Thus, the deformation of the present cylinders is much less than in the conventional cylinders and is considerably less in the high strength cylinder of FIGS. 5–8 which is used preferably for screening high consistency pulp. The overall strength of both embodiments of cylinders hereof is therefore substantially increased in comparison with a conventionally formed cylinder of the same size with identical slot width and pitch.

It will be appreciated that, by the foregoing described method, fabrication costs and times are substantially reduced in comparison with the prior methods previously described. Additionally, this method enables approximately 20% to 80% greater effective screen area than afforded by screen plates manufactured by previous methods, while simultaneously affording increased strength. The capability of replacing only the screening plate portion of the screen cylinder whereby screen cylinder replacement costs is also afforded, together with the foregoing noted advantages.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A screen cylinder comprising:

a generally cylindrical screening medium having a plurality of openings therethrough;

a generally cylindrical structural backing plate for structurally supporting said screening medium and having a plurality of openings therethrough; [and]

said screening medium and said structural backing plate lying concentrically one within the other and having respective opposed surfaces in engagement with one another at an interface therebetween whereby said backing plate structurally supports said screening medium;

one of said screening medium and said backing plate having a plurality of circumferentially extending recesses formed in its opposing surface and opening at the opposing surface of the other of said screening medium and said backing plate at the interface thereof establishing communication between the respective openings of said screening medium and said backing plate; *and* a plurality of axially spaced projections spaced one from the other in the axial direction defining said recesses and projecting radially from one of said screening medium and said backing plate at said interface;

the openings in said screening medium being elongated and extending in a generally axial direction substantially normal to the circumferential extent of said recesses.

2. A screen cylinder according to claim 1 including means for releasably connecting said screening medium and said backing plate one to the other.

3. A screen cylinder according to claim 2, wherein said [connecting] means *for releasably connecting* includes [welding said screening medium and said backing plate to one another] *a weld*.

4. A screen cylinder according to claim 2, wherein said *means for releasably* connecting [means] includes [gluing said screen medium and said backing plate one to the other] *an adhesive*.

5. A screen cylinder according to claim 2 wherein said *means for releasably* connecting [means] includes [soldering said screen medium and said backing plate one to the other] *solder*.

6. A screen cylinder according to claim 1 wherein said recesses are formed in the surface of said screening medium.

7. A screen cylinder according to claim 6 including rivets for releasably connecting said screening medium and said backing plate one to the other.

8. A screen cylinder according to claim 1 wherein said recesses extend axially [at least plural times] *more than* the axial extent of said projections, said openings in said screening medium having an extent sufficient to span in the axial direction two or more recesses.

9. A screen cylinder according to claim 1 wherein said recesses are formed in the surface of said backing plate.

10. A screen plate for screening pulp flowing therethrough comprising:

a screening medium having a plurality of slots therethrough and extending generally parallel to one another, said slots having contoured portions on an inflow side of said screening medium; *and* a structural backing plate having a plurality of openings therethrough;

said screening medium and said structural backing plate lying in registration one with the other and having respective opposed surfaces in engagement with ne another at an interface therebetween whereby said backing plate structurally supports said screening medium;

one of said screening medium and said backing plate having a plurality of recesses formed in its opposing surface and opening at the opposite surface of the other of said screening medium and said backing plate at the interface thereof establishing communication between the openings of said backing plate and said slots of said screening medium;

whereby pulp may flow sequentially through said slots, said recesses and said openings in said backing plate.

11. A screen plate according to claim 10 wherein said screening medium and said backing plate are cylindrical and lie one within the other, said recesses extending circumferentially and substantially uninterruptedly about said one of said screening medium and said backing plate, said slots in said screening medium extending in a generally axial direction and in a direction substantially normal to the circumferential extent of said recesses.

12. A screen cylinder according to claim 11 wherein said slots have an [extend] *extent* sufficient to span, continuously and without interruption, in the axial direction two or more recesses.

13. A screen [cylinder] *plate* according to claim 11 wherein said cylindrical screening medium has elongated outflow slots formed in the opposing surface of said screening medium in radial registry with said contoured slot portions and substantially coextensive therewith, reduced slots in registry with said contoured slot portions and said outflow slots and communicating therebetween, said recesses and said contoured slot portions being formed on the inflow sides of said backing plate and said cylindrical screening medium, respectively, whereby pulp may flow sequentially through said contoured slot portions, said reduced slots and said outflow slots of said screening medium and then through said recesses and said openings of said backing plate.

14. A screen [cylinder] *plate* according to claim 11 wherein said cylindrical screening medium has reduced slots in registry with said contoured slot portions and in communication therewith, said contoured slot portions and said recesses being formed on inflow and outflow sides of said screening medium, respectively, whereby pulp may flow sequentially through said contoured slot portions, said reduced slots, and said recesses of said screening medium and then through said openings of said backing plate.

15. A screen [cylinder] *plate* according to claim [10] *11* including means for releasably connecting said cylindrical screening *medium* and said *cylinder* backing [cylinder] *plate* one to the other.

16. A screen plate according to claim 10 wherein said recesses are formed in the opposing surface of said screening medium.

17. A screen plate according to claim 10 wherein said recesses are formed in the surface of said backing plate.

18. A method of manufacturing a screen for use in screening for pulp, said screen being formed of a screening plate and a backing plate, said screening plate having first and second opposite faces, comprising the steps of:

(a) forming elongated, substantially parallel, grooves in said first face, each groove having a side face and a bottom;

(b) forming openings through the bottom of the grooves in said first face and into the screening plate to terminate within the screening plate short of said second face thereof;

(c) forming elongated grooves in the second face of said screening plate inclined relative to the longitudinal extent of the grooves formed in step (a) and to a depth to expose the openings formed in step (b) so that the openings extend entirely through said screening plate, and leave a plurality of ridges in the second face spaced one from the other there-along and extending in a direction inclined relative to the longitudinal extent of said grooves.

19. A method according to claim 18 wherein said screening plate is formed of metal.

20. A method according to claim 19 including, subsequent to steps (a), (b) and (c), hardening or plating the metal of said screening plate.

21. A method according to claim 18 wherein said screening plate is formed of a ceramic.

22. A method according to claim 18 including machining the first face of the screening layer to form ridges flat on one side and angled on the opposite side.

23. A method according to claim [18] *19* including the step of forming the screening plate into a cylindrical shape to form a metal screen cylinder.

*24. A screen cylinder according to claim 1, including screws for releasably connecting said screening medium and said backing plate.*

*25. A screen cylinder according to claim 2, wherein said means for releasably connecting includes a shrink-fit.*

*26. A screen cylinder according to claim 1, wherein the plurality of openings in said backing plate are positioned wherein the centers of said openings are located on apices of equilateral triangles.*

*27. A screen cylinder according to claim 1, wherein the screen cylinder comprises an axial length, and wherein the openings in said screening medium extend an axial distance substantially corresponding to at least 85% of the axial length of the screen cylinder.*

*28. A screen cylinder according to claim 6, wherein the plurality of axially spaced projections are sized such that the projections do not provide substantial structural support to the screening medium.*

*29. A screen cylinder according to claim 1, wherein the screen cylinder comprises an axial length, and wherein said screening medium utilizes 85-95% of the screen cylinder axial length.*

*30. A screen cylinder according to claim 1, wherein said screening medium is hardened via heat-treating.*

*31. A screen cylinder according to claim 1, further comprising at least one or more of welding, rivets, screws, adhesives, and solder for releasably connecting said screening medium and said backing plate.*

*32. A screen plate according to claim 10, further including means for releasably connecting said screening medium and said backing plate.*

*33. A screen plate according to claim 32, wherein said means for connecting comprises a weld.*

*34. A screen plate according to claim 32, wherein said means for connecting comprises an adhesive.*

*35. A screen plate according to claim 32, wherein said means for connecting comprises solder.*

*36. A screen plate according to claim 10, further including screws for releasably connecting said screening medium and said backing plate.*

*37. A screen cylinder according to claim 1, wherein the screening medium comprises a screening plate having the plurality of openings.*

*38. A screen cylinder according to claim 37, wherein the screening plate includes a plurality of contoured grooves.*

*39. A screen plate according to claim 10, wherein the screening medium comprises a screen plate having the plurality of slots therethrough.*

* * * * *

UNITED STATES PATENT AND TRADEMARK OFFICE

CERTIFICATE OF CORRECTION

PATENT NO. : RE 39,940 E
APPLICATION NO. : 10/660689
DATED : December 18, 2007
INVENTOR(S) : Frejborg et al.

It is certified that error appears in the above-identified patent and that said Letters Patent is hereby corrected as shown below:

Claim 10: Col. 14, Line 23: delete "with ne" and insert -- with one --

Claim 12: Col. 14, Line 45: delete "[extend] *extent*" and insert -- extent --

Claim 13: Col. 14, Line 48: delete "[cylinder] *plate*" and insert -- cylinder --

Claim 14: Col. 14, Line 62: delete "[cylinder] *plate*" and insert -- cylinder --

Claim 15: Col. 15, Line 4: delete "[cylinder] *plate*" and insert -- cylinder --

Claim 15: Col. 15, Line 6: delete "*cylinder* backing" and insert -- *cylindrical* backing --

Claim 18: Col. 15, Line 31: delete "there-along" and insert -- therealong --

Signed and Sealed this

Thirteenth Day of May, 2008

JON W. DUDAS
*Director of the United States Patent and Trademark Office*